Examin

Nov. 29, 1966 R. L. WILCOX 3,289,001

SYSTEM FOR ACTUATING REMOTE ELECTRICAL CIRCUITS WITH A BEAM OF ELECTROMAGNETIC RADIATION

Filed Jan. 23, 1964

Robert L. Wilcox
INVENTOR.

BY James E. Reed
ATTORNEY 3,289,001
Patented Nov. 29, 1966

3,289,001

SYSTEM FOR ACTUATING REMOTE ELECTRICAL CIRCUITS WITH A BEAM OF ELECTROMAGNETIC RADIATION

Robert L. Wilcox, Tulsa, Okla., assignor, by mesne assignments, to Esso Production Research Company, Houston, Tex., a corporation of Delaware Filed Jan. 23, 1964, Ser. No. 339,739
19 Claims. (Cl. 250—199)

Figures 1, 2:
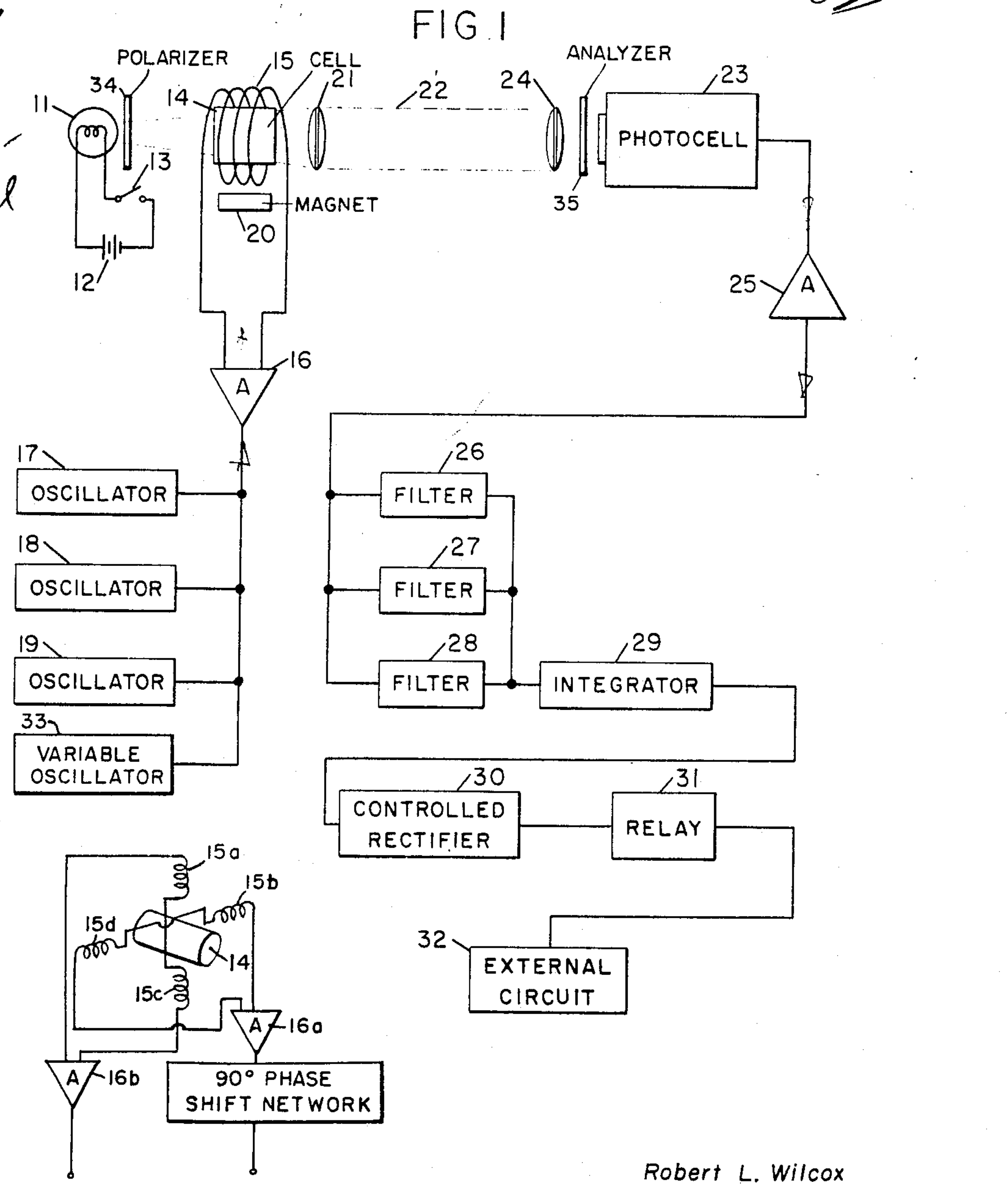

The present invention relates to means for actuating electrical circuitry and is particularly concerned with an improved system for energizing circuits from a distance by means of a beam of light or similar electromagnetic radiation.

Remote control systems utilizing visible light or infrared radiation are widely used to energize electrical circuits and thus actuate electric motors and similar devices. Such systems in their simplest form normally include a transmitter containing a source of visible or infrared rays which can be energized as desired and a remote receiver containing a photoelectric cell, an amplifier, and a relay, a controlled rectifier or a similar device for initiating current flow in an associated electrical circuit in response to energy transmitted by the rays. The cells employed in such systems normally respond to any incident energy above their threshold level and hence radiation independent of the source provided in the system may in some cases activate the receiver and associated circuitry. This permits accidental or unauthorized operation of the apparatus controlled by the circuitry. Similar systems utilizing radio frequency transmitters and receivers are employed to avoid this difficulty but are not wholly satisfactory, particularly where stray or random electrical or electromagnetic fields may interfere with their operation or where the generation of radio frequency signals may adversely affect other equipment in the immediate vicinity. Still other systems have been proposed but have not been found practical because of the power requirements, the size of the equipment needed, and other difficulties.

The present invention provides a new and improved remote control system utilizing visible light, infrared rays or similar electromagnetic radiation which is relatively free of the disadvantages encountered with systems available in the past. The improved system of the invention differs from earlier systems in that it employs a beam of visible light, infrared rays or similar radiation which is modulated by passing the beam through a cell containing a polymeric material whose radiation transmissibility varies as a function of the magnetic flux intensity to which the material is subjected. By varying the flux intensity about the cell, a beam having preselected characteristics is produced. This beam is directed onto a photoelectric cell or similar device which generates a corresponding electrical signal in response to the incident radiation. The resultant signal is passed through one or more filters for the elimination of transients not possessing the selected characteristics and is then utilized to actuate a relay, controlled rectifier or similar device by means of which the circuit of interest is energized. The system thus provided cannot readily be activated by accident, is difficult to jam, is not seriously affected by spray or random electrical or electromagnetic fields, has low power requirements, can be made extremely compact, and is relatively inexpensive. Because of these advantages, it has many applications.

The exact nature and objects of the invention can best be understood by referring to the following detailed description of apparatus embodying it and to the accompanying drawing in which:

FIGURE 1 is a schematic diagram of apparatus for actuating a remote circuit; and FIGURE 2 depicts an alternate arrangement of the modulation of cell and coils of FIGURE 1.

The system shown in the drawing includes a transmitter containing a radiation source 11 which is driven by a battery or other power source 12 and is controlled by a switch or related device 13. This particular system employs light in the visible spectrum and hence an incandescent bulb powered by dry cells or other batteries may be utilized as the source. A similar source may be used in an infrared system if suitable filters, well known to those skilled in the art, are provided. One of the advantages of this system is that radiation losses in the modulation stage of the apparatus are low and thus energy can be transmitted over relatively long distances with low power requirements. In lieu of utilizing photic radiation in the visible spectrum with a wave length between about $3.9 \times 10^{-5}$ and about $7.7 \times 10^{-5}$ centimeters, infrared or other infraphotic radiation with a wave length greater than $7.7 \times 10^{-5}$ centimeters may be used. Tests have shown that infrared rays can be modulated with particular effectiveness and hence radiation with a wave length between about $7.7 \times 10^{-5}$ and about $3 \times 10^{-2}$ centimeters is preferred in certain applications of the system. Hertzian or radio frequency radiation can also be used in some cases. Conventional apparatus including infrared generators, spark gap discharge devices, oscillating circuits and the like which will be familiar to those skilled in the art may be employed for generating radiation in the infraphotic range. Coherent light sources such as lasers may also be employed in some instances.

In addition to the radiation source, power supply and switch or similar control device, the transmitter in the apparatus shown in the drawing includes a modulation cell 14 through which the beam of radiation is passed. The cell is normally made of glass or other material which is transparent to the type of radiation employed and contains a cavity within which the polymeric material employed for modulation purposes is held. The radiation beam has to pass through only a small amount of the material and hence the cell cavity will generally measure from about 0.05 millimeter to about 2 centimeters along the path of the radiation, depending upon the metallic content of the polymeric material and the extent to which it is diluted with solvent. The width and height of the cavity should be sufficient to pass a beam of the desired size and may be varied considerably. In general, a pencil size beam is used but, where transmission over very long distances is required, scattering may dictate the use of a much larger beam.

The polymeric material employed for modulating the beam of radiation is a hydrocarbon polymer containing submicroscopic particles of iron, nickel or cobalt which appear to be tied together by the hydrocarbon molecules to form a metal chain. Such materials may be prepared by reacting relatively large quantities of a Group VIII, Series 4, transition metal carbonyl compound with a carbon-to-carbon ethylenically unsaturated hydrocarbon polymer in a nonoxidizing atmosphere or under nonoxidizing conditions to form an oil-soluble metal carbonyl polymer complex.

The metal carbonyls suitable for purposes of the invention are group VIII transition metal carbonyl compounds or iron, nickel or cobalt and their substituted derivatives, and combinations and mixtures thereof. The carbonyls employed can be in monomeric or polymeric form and may be either substituted or unsubstituted. The stable unsubstituted carbonyls and the hydrocarbon substituted carbonyls, especially those containing at least 2 replaceable carbonyl groups, are of particular interest for purposes of the invention. The metal carbonyls employed can be in liquid form, as in the case of $Fe(CO)_5$; in the form of a gas or sublimate vapor, as in the case of $Fe(CO)_5$; or in the form of a solid, as in the case of $Fe_3(CO)_{12}$ and $Fe_2(CO)_9$. Many carbonyls sublime and hence these compounds may be initially employed as a solid and may subsequently, depending upon the reaction conditions, change to a vapor as the reaction progresses.

Suitable metal carbonyl compounds for purposes of the invention include those monomeric, dimeric, trimeric and tetrimeric carbonyls having from 4 to 12 carbonyl groups, preferably 4 to 8 carbonyl groups, wherein the carbonyl groups are bonded directly to the metal such as iron tetracarbonyl, di-iron nonacarbonyl, tri-iron dodecacarbonyl, di-cobalt octacarbonyl, tetracobalt dodecacarbonyl, nickel tetracarbonyl and similar unsubstituted metal carbonyls.

Substituted metal carbonyls which may be employed for purposes of the invention include those carbonyls having one or more substituent groups or electron donating ligands bonded to the metal atoms of the carbonyl compound. The substituent groups may be hydrocarbon groups such as the butadiene, 1,3-octadiene, acetylene, propylene, cyclopentadiene, cyclooctatetraene, $C_1$ to $C_3$ alkyl-substituted cyclopentadiene groups and the like. Examples of substituted carbonyls which may be employed include 1,3-butadiene-iron tricarbonyl, cyclooctatetraene-iron tricarbonyl, cyclopentadienyl cobalt dicarbonyl, dicyclopentadienyl di-iron tetracarbonyl, acetylene dicobalt hexacarbonyl and the like, and combinations thereof.

A further class of suitable carbonyl compounds includes the neutral and anionic metal carbonyl hydrides wherein 1, 2, 3, 4 or more hydrogen atoms, as well as the carbonyl group itself, are bonded directly to the metal, or wherein a combination of hydrocarbon groups, the carbonyl group and other ligand substituents are bonded directly to the metal along with the hydrogen atoms. Suitable transition metal carbonyls of this type include the neutral cobalt tetracarbonyl monohydride $HCo(CO)_4$, the neutral iron tetracarbonyl dihydride $H_2Fe(CO)_4$, the anionic bis iron octacarbonyl monohydride $[HFe_2(CO)_8]^-$, the anionic tris iron undecane carbonyl monohydride $[HFe_3(CO)_{11}]^-$, the anionic iron tetracarbonyl monohydride and the like. Also suitable are the neutral salts of the anionic metal carbonyl hydrides. Suitable basic or neutralizing agents for reaction with the anionic hydrides include the alkali, alkaline earth and heavy metal oxides and hydroxides; ammonia; amines such as fatty acid amines and alkyl amines; polyamines such as alkylene diamines; hydroxyamines; quaternary ammonium hydroxides and the like. One example of a suitable neutral salt formed by the reaction of an alkyl amine with the anionic metal carbonyl hydride is $[C_2H_2NH]+[HFe_3(CO)_{11}]$. Other ligands which may be employed include phosphines such as triphenylphosphine, arsines, amines, halides, isonitriles, cyanides and the like. Examples of mixed metal carbonyl hydrocarbon hydrides include cyclopentadienyl iron dicarbonyl hydride, and butadiene cobalt carbonyl hydride.

The materials utilized for purposes of the invention may be produced from any unsaturated polymer or elastomer regardless of the method of polymerization employed to obtain the original starting polymer. The carbonyl-polymer complexes can thus be prepared with unsaturated polymers normally produced with heavy metal-organo metal catalysts such as aluminum alkyl-titanium halide systems, including the aluminum triethyltitanium tetrahalide systems referred to as the Ziegler catalysts; with metal alkyl-cobalt salt complex catalyst systems; with alkali metal catalysts such as alkyl lithium or lithium metal catalysts; and with Friedel-Crafts catalysts such as aluminum chloride, boron trifluoride and the like. Polymers commonly prepared by organic or inorganic free radical initiators or anionic or cationic emulsion polymerization techniques and other methods may also be used. Many such polymers are described in greater detail in "Synthetic Rubber" by G. S. Whitney, J. Wiley and Sons, Inc., New York (1954). Polymerization processes for preparing such polymers are described in detail in "Preparative Methods of Polymer Chemistry," by W. Sorenson and T. W. Campbell, Interscience Publishers, New York (1961).

In general the polymers suitable for use in preparing the modulating materials can be broadly categorized as ethylenically unsaturated polymers having average molecular weights between about 10,000 and about 3,000,000 and Wijs iodine numbers between about 1 and about 600. The unsaturation of the polymers may be in the main chain as in the case of natural rubber and synthetic elastomers such as butyl rubber which are prepared by head to tail polymerization methods or may instead be in the side chains of the polymer as in the case of vinyl polybutadiene and other polymers prepared by 1,2 polymerization and in the case of polyisoprene and similar materials produced by 3,4 addition. The ethylenically unsaturated bonds can also be present in both the main and side polymer chains. The degree of unsaturation may vary between about 0.5 to 99.5 mole percent. The unsaturated linkages can be conjugated, isolated, or cumulative or a mixture or combination of these structural arrangements. The polymers employed can be partially vulcanized with conventional curing agents or copolymerized with other polymerizable monomers or polymers, provided that at the time of reaction with the metal carbonyl compound there remains some degree of carbon-to-carbon ethylenical unsaturation within the polymer chain or molecule.

Examples of unsaturated polymers which may be utilized for purposes of the invention include:

(1) Copolymers containing a major amount of an isoolefin and a minor amount of a multiolefin. These copolymers are commonly referred to as "butyl rubber" and their preparation and uses are described in U.S. Patent 2,356,128 to Thomas et al. Such polymers normally comprise from about 85 to about 99.5 weight percent of a $C_4$ to a $C_8$ isoolefin such as isobutylene or a $C_1$ to a $C_3$ alkyl substituted olefin such as 2-methyl-1-butene, and from about 0.5 to about 15.0 weight percent of a $C_4$ to $C_{14}$ multiolefin such as dimethylallyl, a cyclic diene such as cyclopentadiene or cyclohexadiene, a conjugated diene such as isoprene or 1,3-butadiene, or a hydrocarbon-substituted conjugated diene such as dimethyl butadiene or the like. These polymers commonly have Wijs iodine numbers from 1 to 50 and from about 0.5 to about 10.0 mole percent unsaturation.

(2) Copolymers of a diene and a vinyl aromatic which are generally referred to as GR-S or SBR type synthetic rubbers and are commonly made by copolymerizing about 30 to 80 weight percent of a $C_4$ to a $C_8$ conjugated diene such as butadiene or isoprene, a cyclic diene such as cyclopentadiene or cyclohexadiene, or an alkyl substituted diene such as dimethyl butadiene with from 70 to 20 weight percent of a vinyl aromatic such as styrene or dimethyl styrene or an alkyl-substituted vinyl aromatic such as divinyl benzene.

(3) Polydienes such as those produced by the homopolymerization of conjugated dienes like butadiene, isoprene, cyclopentadiene and the alkyl substituted derivatives of such conjugated dienes.

(4) Copolymers prepared by copolymerizing major amounts of from 50 to about 98 percent by weight of a $C_4$ to $C_8$ cyclic or straight chain diene such as butadiene, isoprene, cyclopentadiene, hexadiene or the like with a minor amount of from about 2 to about 40 weight percent of a $C_2$ to a $C_6$ mono-olefin such as ethylene, propylene, butylene, isobutylene, pentene or the like.

(5) Natural rubber and natural rubber latices such as those natural elastomeric products derived from latex of the Hevea and Fiscus species. These products are characterized by high unsaturation, rubber-like characteristics, and Wijs iodine numbers above 200.

The homopolymers and copolymers described above may be copolymerized further with minor amounts, generally between about 1 and about 30 weight percent, of organic polymerizable monomers or other polymerizable polymers containing 1 or more vinyl, vinylene, or vinylidene groups. Suitable materials include vinyl aromatics such as styrene and divinyl benzene, vinyl cyanides such as acrylonitrile and ethacrylonitrile, vinyl esters of short chain fatty acids such as vinyl acetate, long chain fatty alcohol esters of acrylic acid and $C_1$ to $C_3$ alkyl substituted acrylic acids, halogenated vinyl compounds such as vinylidene chloride, vinyl chloride, chloroprene, ethylene dichloride, and the like.

Unsaturated polymers of the types described above can be reacted with the metal carbonyl compounds in either bulk or solution. In order to assure rapid reaction and intimate contact of the metal carbonyl with the polymer during the course of the reaction, it is preferred that the polymers be dissolved in an organic solvent. Polymers having molecular weights below about 50,000 generally have viscosities low enough to permit use of the bulk polymers; while those having high molecular weights, particularly above about 100,000, generally require solvation to obtain the desired handling and mixing characteristics. These polymers may then be used in solvents in varying proportions. Very high molecular weight polymers such as those having molecular weights above about 200,000 are normally employed in solutions in concentrations of from about 1 to about 20 weight percent. Concentrations between about 1 to about 6 weight percent are particularly effective.

Solvents which may be employed in carrying out the reaction between the polymers and metal carbonyl compounds include aliphatic and aromatic hydrocarbons such as benzene, toluene, xylene, hexane, heptane, petroleum naphtha, cyclohexane, and the like; ethers such as tetrahydrofuran, 1,2-dimethoxyethane, bis (2-methoxyethyl) ether and the like; ketones such as acetone, acetyl acetone, methyl ethyl ketone, methyl isobutyl ketone, cyclohexanone and the like; carbon disulfide; chloroform; and mixtures of such solvents.

The basic complex unit in the polymer-carbonyl reaction product is believed to have the following structure

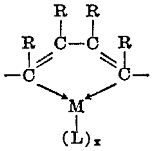

where M is a polyvalent heavy metal such as iron, nickel or cobalt; R represents a substituent group such as hydrogen or a hydrocarbon radical, particularly a $C_1$ to $C_3$ alkyl group, or a combination of such substituent groups; L is an electron donating ligand group bonded directly to the metal such as carbonyl, hydrogen, hydrocarbon or similar ligand group previously discussed; *x* designates the number of ligand groups and, depending on the metal and the number of electrons shared by the ligand groups with the metal, is from 1 to 4, usually 3.

The valence bonds of the polymeric complex unit, $R_4C_4NL_x$, are satisfied by one or more other polymeric complex units or by other ethylenically unsaturated or saturated hydrocarbon units within the main or side chain, such as $—(CR'_2)_n—$, $—(CR'=CR')_n—$ $$—(CR'_2—CR'=CR')_n—$$

and the like wherein R' is a radical such as hydrogen or an alkyl, aryl, alkaryl, olefinic, cyclodiene or a similar group and *n* is a number from 1 to 10, preferably from 2 to 8. Suitable examples include the methylene, vinylene and vinylidene radicals. The complex unit can be interspersed within the other groups of the polymer in any position, including isolated, cumulative or conjugate positions. The ends of the polymer main or side chain groups and of the complex unit where this unit is on the end of the chain are terminated with the usual terminal end groups such as $CR'_3—$, $CR'_2=CR'—$ and hydrogen atoms. The exact amount and nature of the complex unit distribution within the polymer depends upon the type of polymer employed as a starting material, the degree of unsaturation before and after the reaction, and other factors which can be controlled during production of the material.

In the reaction between the polymer and the metal carbonyl compound, the isolated ethylenically unsaturated bonds are transposed to conjugate positions. In the reaction of polybutadiene with iron carbonyl, for example the pair of double bonds in two polymerized monomers is conjugated to produce the following structure

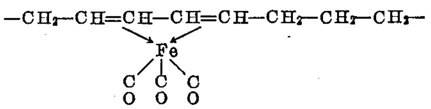

where the unsatisfied valences are satisfied by the remaining portions of the polybutadiene structure, such as $C_4H_6$ groups or multiples thereof or terminal groups such as $C_4H_7$ groups. The polybutadiene complex may also be represented generally by the formula

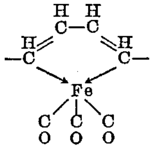

The reaction of the metal carbonyl and polymer is carried out in bulk or solution in a nonoxidizing atmosphere or under nonoxidizing conditions. The quantity of the carbonyl utilized depends in part upon the degree of unsaturation of the polymer and the desired amount of metal to be complexed with the polymer, together with the desired characteristics of the polymer and its proposed use. The maximum quantity of metal carbonyl that can be complexed with the polymer can be determined stoichiometrically by the degree of the polymer unsaturation, since each pair of carbon-to-carbon ethylenically unsaturated bonds is capable of complexing one mole of metal carbonyl. The reaction can be carried out with less than the stoichiometric quantity of the metal carbonyl and may take place in situ during the polymerization, copolymerization or dehydrogenation of a polymer or its monomers. The metal carbonyl concentration in general should exceed 10% by weight of catalytic quantities, since amounts less than this are normally ineffective to form a complexed polymer suitable for purposes of the invention. The preferred amount of metal carbonyl based on the weight of the monomeric polymer unit or copolymer unit in the polymer will normally exceed 50% by weight and is generally in the range of from 100 to 800 percent by weight or higher. The concentration limits can also be expressed in terms of the number of moles of metal carbonyl present per mole of ethylenical unsaturation in the polymer. At least 0.15 mole per mole should normally be used and from about 0.25 to about 2.50 or more moles per mole is generally preferred. The quantity of metal carbonyl and metal complexed with the polymer can be determined by analysis of the infrared spectra of polymer sample or by conventional combustion techniques.

The reaction between the carbonyl and the polymer to form the complex material proceeds over a wide range of temperatures. Temperatures between about 30° and about 150° C. may be employed, but those in the range between about 80° and about 130° C. are generally preferable. At lower temperatures, the reaction proceeds without significant degradation of the polymer molecular weight. As the reaction temperature is increased, depolymerization of the polymer takes place. The reaction may be carried out at elevated temperatures with the polymer in bulk or in solution in hydrocarbon solvents if degradation is not important. Where it is desired to maintain the molecular weight, the reaction is preferably carried out in solvent solutions containing polar protective solvents.

The time for completion of the complex reaction depends upon the reaction temperature, the metal carbonyl utilized and other preselected reaction conditions, and may range from about 1 hour to about 72 hours. In general the reaction is normally complete in from two to about six hours at temperatures above 70° C. Gelation and polymerization of the polymer during the reaction are normally prevented by employing a blanket of an inert gas such as nitrogen, helium, carbon monoxide, a rare gas or the like over the polymer after the reaction zone or vessel has been swept clear of air or oxidizing compounds and gases. The reaction proceeds at atmospheric pressure but may be carried out in general at pressures within the range between about 0.1 and 10 atmospheres or higher. A protective organic solvent may be employed alone or with a hydrocarbon polymer solvent in carrying out the reaction. This reduces molecular weight degradation of the polymer at elevated temperatures. Polar solvents having greater polarity than hydrocarbons and less than acids, acid anhydrides, and acid chlorides may be employed. The saturated organic solvents containing carbon hydrogen and oxygen and one or more ketones, ether or hydroxyl groups are preferred. The protective solvent employed should be wholly or partially miscible with the unsaturated polymer or polymer solution and in some cases may function as both the polymer solvent and the protective solvent. Materials which may be used in this manner include 1,3-dialkoxy alkanes such as 1,3-dimethoxyethane. When employed in combination with a hydrocarbon solvent, the protective solvent normally comprises from about 5 to about 50% of the solution.

Suitable examples of polar solvents include the substituted and unsubstituted, saturated and unsaturated $C_1$ to $C_{30}$ aliphatic, alicyclic, aromatic, heterocyclic and alkylaromatic solvents such as cyclohexanol, methanol, ethanol, tertiary butanol, benzyl alcohol, propylene glycol, hexylene glycol, acetone, cyclohexanone, methylethyl ether, phenyl ether, benzaldehyde, acetaldehyde, benzylacetate, tertiary butyl acetate, and mixtures and combinations thereof.

The preparation of the polymeric complexes and metal-containing polymers can be aided if desired by the use of high energy and actinic radiation to replace the heat normally employed. Gamma radiation or ultra violet radiation in the range between about 1850 and 5500 angstroms may be used alone or in combination to effect reaction of the metal carbonyl and polymer.

A preferred process for forming the polymer comprises the addition of an unsaturated polymer to a solution containing a hydrocarbon solvent and polar solvent, sweeping the reaction vessel with hydrogen to remove air, adding the metal carbonyl to the polymer solution, heating the solution to a temperature between about 70° C. and about 130° C., and subsequently recovering the complex polymer by precipitating it in a polar solution in which the polymer is insoluble, such as a solution of an aliphatic alcohol and hydrochloric acid or a similar strong acid.

The metal-containing polymers prepared as described above may be heated to elevated temperatures in order to obtain materials having magnetic properties. The heating is carried out at temperatures in excess of 100° C., preferably between about 150° C. and about 1000° C., for a period sufficient to obtain the magnetic properties. At relatively high temperatures, a period of from about 10 minutes to about 1 hour will normally be required; whereas a period of from about 1 to about 5 hours is generally necessary at lower temperatures in the range between about 200° C. and about 500° C. After heating, the polymers exhibit magnetic properties and will respond to magnetic fields without separation of the magnetic components. In other words, the heated polymer demonstrates induced magnetism when placed in a magnetic field. The heating effects the formation of small, finely divided metal or metal oxide crystals throughout the polymer chain. These crystals are apparently intertwined along the chain and are not separated by ordinary magnetic separation methods. They commonly have an average cluster or particle size of from about 10 to about 150 angstroms. The growth and ultimate size of the crystals and hence their magnetic properties are dependent in part upon the range of heating. The quantity of induced magnetism generally increases with time and temperature to an optimum point.

The heat treatment of a metal complexed polymer can be carrried out with solid or rubbery complex elastomers or with hydrocarbon solutions of the polymer. Heat treatment of the rubbery metal complexed elastomer either alone or in combination with other recited elastomers produces a dark colored solid or plastic capable of being ground into a dispersible, finely divided powder having magnetic properties. The metal complexed polymer can also be dissolved in a solvent or employed in the form of a slurry in a non-solvent and heat treated at 100 to 200° C. to provide liquid solutions and slurries exhibiting magnetic properties. Since a liquid solution or slurry is generally employed for purposes of the invention, it is preferable that the heat treatment be carried out in the presence of additional metal carbonyl. Either the same or a different metal carbonyl from that used to prepare the complex polymer may be employed. The addition of from about 100 to about 1000 weight percent of excess metal carbonyl in the solvent or slurry promotes effective formation of magnetic properties in the polymer.

In lieu of heating the complexed polymer as described above, the polymeric starting material can be reacted with an excess of the carbonyl in the presence of a magnetic field to obtain the desired magnetic polymer. The field employed should be somewhat stronger than the earth's magnetic field and will generally be between about 2 and about 10,000 oersteds, preferably between about 10 and about 1000 oersteds. The field may be either stationary or moving and may be constant or pulsating. It can be applied for a period of from about 10 minutes to an hour or longer at any time during the reaction, preferably toward the end of the reaction, or may instead be applied during the entire reaction. The use of large excesses of carbonyl and long reaction periods is particularly effective in this procedure. Studies have shown that the inclusion of from about 9 to about 200, preferably from about 40 to about 150, parts of carbonyl by weight per part of polymer and reaction periods of from about 15 to about 120 hours, preferably from 24 to 96 hours, results in longer chains containing the metallic particles and more pronounced magnetic properties. The structural unit thus formed, where iron carbonyl is used, can be represented by the formula

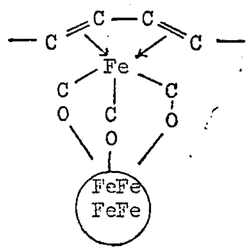

It will be noted that the above structure contains several additional iron molecules arranged in a cluster on the internal iron carbonyl group. The iron molecules making up these "clumps" form the long chains previously mentioned in the presence of a magnetic field and are apparently responsible for the superior magnetic properties of the material produced in this manner.

An alternate procedure for preparing the material containing the metallic "clumps" is to first prepare the hydrocarbon polymer-metal carbonyl complex as described earlier and then react this material with excess carbonyl of the same or a different metal in the presence of a magnetic field. A solution of the metal complexed polymer in a solvent may be heated at a temperature between about 100 to 300° C. for a period of from about 12 to about 120 hours with the excess carbonyl under an inert atmosphere in carrying out the second reaction. The carbonyl can be added all at once or divided into several portions and added at intervals of several hours during the reaction period. The resultant liquid product contains a solution of the polymer and highly dispersed metal which is nonseparable under a strong magnetic field. The solid polymer can be recovered from the solvent and unreacted carbonyl by vacuum distillation at room temperature. The solid product will generally contain from 30 to 75 weight percent metal, although the metal content can be held at a lower level if desired.

The magnetic material can be prepared in liquid form initially or instead can be vulcanized or solidified and later dissolved or slurried in a suitable solvent to provide a liquid having magnetic properties. The use of colorless solvents improves the light transmissibility of the magnetic material and is generally preferred. The material may be diluted with 150 parts or more of solvent, depending in part upon the length of the radiation path through the cell. Where no solvent is used, a very thin cell about 0.1 millimeter in thickness will normally be employed. With a solvent-to-magnetic polymer ratio of 150:1, on the other hand, a cell a centimeter or so in thickness may be satisfactory.

The cell 14 containing the liquid magnetic polymer or liquid solution of the polymer described above is surrounded by a coil 15 which is connected to an amplifier 16. The amplifier is in turn connected to one or more oscillators, pulse generators or similar sources of alternating or pulsating D.C. current. The system shown employs three oscillators 17, 18 and 19 connected in parallel. The modulating current source shown is an oscillator composed of a simple transistor circuit tuned for single frequency operation but more complex circuits may be utilized if desired. The use of multiple oscillators or similar circuits as shown permits the generation of a more complex signal than can be produced with a single circuit but is not essential. It is also within the scope of the invention to employ multiple oscillators or similar circuits connected in series rather than in parallel as shown. The number of turns in the coil and the geometric arrangement of the coil with respect to the cell containing the polymer will depend upon the amount of modulation required in the system. In general, very small changes in the applied magnetic field will produce appreciable changes in the radiation transmissibility of the magnetic polymer and hence only a relatively small coil need be provided. The modulating effect of the polymer varies with changes in the angle between the axis of the magnetic field and the path of radiation to the polymer. At constant field intensity, transmissibility of the polymer increases as the angle is increased until an angle of about 60° is obtained. Thereafter the transmissibility decreases as the angle is increased further. In view of this effect, it may be advantageous in some instances to provide an angle between the field axis and the radiation path. In most cases, however, the field will extend parallel to the path of the radiation.

The response of the magnetic polymer to changes in the applied flux intensity normally occurs at twice the frequency of the applied signals because of symmetry of the response curve about the zero field axis. The receiver can therefore be tuned to twice the oscillator frequency to pass the modulated signal generated in response to the radiation. Alternatively, a biasing magnetic field can be applied to the polymer cell so that the response curve is shifted and becomes linear in the vicinity of zero field. Under these conditions the response frequency will be identical to that of the applied field. A permanent magnet 20 mounted near the polymer cell as shown can be used to provide the biasing field. Direct current can also be superimposed on the modulating coil to produce the required bias.

The beam of radiation produced by source 11 is directed through the polymer cell 14 and is modulated in intensity in response to changes in the magnetic field applied by means of coil 15 as pointed out above. The modulated beam emerging from the cell passes through lens 21 and follows beam path 22 to the receiver, which may be located at any desired distance from the transmitter. One or more mirrors, refraction lenses or similar devices may be provided to alter the beam path if desired.

The receiver in the apparatus shown comprises a photoelectric cell 23 or similar detector and preferably includes a lens 24 for focusing the beam onto the sensitive area of the cell. The photoelectric cell employed may be a photoconductive device such as a selenium cell, a photo-emissive device in which an emission of electrons occurs in a vacuum or across a gas filled space such as an alkali cell, or a photovoltaic cell depending on contact between a metal and a semi-conductor such as a rectifier cell. An amplifier 25 is connected to the output terminals of the photocell to increase the intensity of the output signal through a useful level. The output signal thus produced is passed to one or more filters which pass only those signal components whose frequency corresponds to the transmitter frequency generated by means of the oscillators or similar circuits contained therein. This precludes operation of the apparatus in response to radiation different from that emitted by the transmitter. As pointed out previously, the filter frequency will be tuned to twice the oscillator frequency unless a biasing field is applied by means of a permanent magnet as shown in the drawing. The system illustrated includes three filters 26, 27 and 28 which correspond to the three oscillators employed in the transmitter and thus pass transients corresponding to those generated by the modulated beam, while eliminating all others. It will be apparent that this use of multiple oscillators and filters permits the development of an almost infinitely complex system which is virtually jam proof and cannot be actuated except in response to radiation from the transmitter intended for use with the receiver. Again, however, the use of multiple oscillators or similar circuits and corresponding multiple filters is not essential. A single oscillator and filter may be used if desired.

The transients passing the filter or filters in the receiver are fed to integrator 29 where they are rectified to build up a D.C. voltage. This voltage is then fed to a controlled rectifier 30 or similar trigger circuit which in turn actuates relay 31. The relay is connected to an external circuit 32 which controls the operation of an electric motor or similar device. It will be recognized that the system is not restricted to the use of any particular type of integrator, trigger circuit and relay and that the components selected will depend in part upon the external circuit which is to be controlled by means of the system. The apparatus depicted provides an efficient and convenient system for the remote control of motors and other electrically operated devices and is particularly useful where a portable transmitter of small size and light weight is required. Although the remote control of garage doors and similar equipment is perhaps the most commonplace application for such a system, there are many other applications where the advantages over conventional systems are significant.

In lieu of utilizing the apparatus to control the actuation of a single external circuit as described above, the system can be employed for multichannel operation by connecting a separate integrator or similar circuit to each filter and utilizing the output signals from these to drive separate trigger circuits and relays which in turn actuate separate external circuits. In this mode of operation, the oscillators or similar circuits in the transmitter can be operated individually or in unison in order to activate the external circuits associated with the receiver individually or simultaneously. Since an extremely large number of oscillators and filters can be used in parallel if desired, a single beam of radiation can be employed for the remote control of many different devices. A variable oscillator or similar circuit, as indicated by reference numeral 33, can be used in lieu of a multiplicity of fixed frequency circuits where simultaneous operation of the external circuits is not required. In other cases, two or more such variable circuits may be provided to permit the simultaneous activation of several different devices and yet reduce the total number of circuits required for multichannel operation.

A further modification of the system described above involves the use of a beam of polarized light. Tests have shown that the magnetic polymeric material tends to rotate a polarized beam and that this can sometimes be used to advantage. By placing a conventional polarizer between the light source and polymer cell as indicated by reference numeral 34 and providing an analyzer between the polymer cell and photoelectric cell as shown by reference numeral 35, more effective modulation can in some cases be obtained. The analyzer, which may also be of a conventional type, can be installed in either the transmitter or receiver. Where a mobile transmitter is used, it will generally be preferred to mount the analyzer in the transmitter to facilitate precise alignment. The use of a polarized beam may in some cases also further reduce the effect of random light.

In still another modification of the system described earlier, the coil surrounding the polymer cell 15 may be replaced by four coils **15*a*, 15*b*, 15*c* and 15*d* arranged in quadrature as indicated in FIGURE 2 to provide a rotating magnetic field in place of the pulsating or alternating field. Amplifiers 16*a* and 16*b* may be provided in place of the single amplifier 16** used in the embodiment of FIGURE 1. This may in some cases provide more rapid modulation of the beam of radiation and eliminate the necessity for using an oscillator or similar device for modulation purposes. Rotating fields are employed in many conventional devices and hence the operation of the system shown in FIGURE 2 will be apparent to those skilled in the art.

What is claimed is:

1. Apparatus for actuating an electrical circuit which comprises means for generating a beam of electromagnetic radiation; a cell containing a polymeric material including metallic particles with magnetic properties through which said beam passes, the radiation transmissibility of said material varying with changes in a surrounding magnetic field; means for establishing and changing a magnetic field about said polymeric material; a radiation sensitive device for generating an electrical signal in response to energy transmitted by said beam; means for eliminating all but selected transients from said electrical signal; and means for energizing an external circuit in response to said selected transients.

2. Apparatus as defined by claim 1 wherein said means for generating said beam comprises a source of visible light.

3. Apparatus as defined by claim 1 wherein said means for generating said beam comprises an infraphotic radiation source.

4. Remote control apparatus comprising a source of electromagnetic radiation having a wave length in excess of about $3.9\times10^{-5}$ centimeters; a modulation cell through which radiation from said source may pass, said cell containing a hydrocarbon polymer-Group VIII, Series 4, metal carbonyl complex having magnetic properties; means for changing the magnetic field surrounding said complex; a detector sensitive to electromagnetic radiation for generating an electrical signal in response to energy transmitted by said beam; means for eliminating all but selected transients from said electrical signal; and means for completing an electrical circuit in response to said selected transients.

5. Apparatus as defined by claim 4 wherein said complex is an unsaturated hydrocarbon polymer-iron carbonyl complex.

6. Apparatus as defined by claim 4 wherein said means for changing said magnetic field comprises a coil surrounding said modulation cell and a source of modulating current connected to said coil.

7. Apparatus for transmitting a signal which comprises a radiation source for generating a beam of radiation having a wave length in excess of about $3.9\times10^{-5}$ centimeters; a modulation device containing an unsaturated hydrocarbon polymer-Group VIII transition metal carbonyl complex having magnetic properties through which said beam of radiation may pass; means for establishing and modulating a magnetic field about said modulation device; a photoelectric cell for generating an electrical signal in response to energy transmitted by said beam to said photoelectric cell; electrical filter means for eliminating all but modulated transients corresponding to the modulations of said magnetic field from said electrical signal; and means for energizing an electric circuit in response to said modulated transients.

8. Apparatus as defined by claim 7 including means for applying a biasing magnetic field about said modulation device.

9. Apparatus as defined by claim 7 wherein said complex is contained in a solvent in said modulation device.

10. Apparatus as defined by claim 7 wherein said means for establishing and modulating said magnetic field includes a coil surrounding said modulation device and a plurality of oscillators for energizing said coil and wherein said filter means includes a plurality of parallel filters.

11. Apparatus as defined by claim 7 wherein said means for establishing and maintaining said magnetic field includes four coils arranged in quadrature about said modulation cell and means for energizing said coils to produce a rotating magnetic field.

12. Apparatus as defined by claim 10 including means for independently energizing an electrical circuit in response to modulated transients from each of said parallel filters.

13. Apparatus for actuating an electrical circuit which comprises means for generating a beam of visible light; a modulation device containing an unsaturated hydrocarbon polymer-Group VIII, Series 4, metal carbonyl complex having magnetic properties through which said beam of light may pass; means for establishing and modulating a magnetic field about said modulation device; a photoelectric cell for generating an electrical signal in response to light transmitted by said beam to said photoelectric cell; electrical filter means for eliminating all but modulated transients corresponding to the modulation of said magnetic field from said electrical signal; and means for energizing an electrical circuit in response to said modulated transients.

14. Apparatus as defined by claim 13 including a polarizer located between said means for generating said beam of light and said modulation device and an analyzer located between said modulation device and said photoelectric cell.

15. Apparatus as defined by claim 13 wherein said complex is a butyl rubber-iron carbonyl complex.

16. Apparatus as defined by claim 13 wherein said means for establishing and modulating said magnetic field comprises a coil surrounding said modulation device and a variable oscillator for energizing said coil.

17. Apparatus as defined by claim 13 wherein said filter means includes a plurality of parallel filters and including means for independently energizing an electrical circuit in response to modulated transients from each of said parallel filters.

18. Remote control apparatus comprising a source of radiation having a wave length in the visible and infrared spectrum; a modulation cell containing an unsaturated hydrocarbon polymer-iron carbonyl compound complex with magnetic properties through which a beam from said source of radiation may be passed; a modulating coil located adjacent said modulation cell; means for energizing said modulation cell with a modulating current; a photoelectric cell in the path of said beam for generating an electrical signal in response to energy transmitted by said beam; electrical filter means for eliminating from said electrical signal transients not corresponding to said modulating current; and means for energizing an electrical circuit in response to transients passing said filter means.

19. Apparatus as defined by claim 18 wherein said source of radiation is an infrared generator.

References Cited by the Examiner

UNITED STATES PATENTS

| | | | |
|---|---|---|---|
| 2,929,922 | 3/1960 | Schawlow et al. | 250—199 |
| 3,215,038 | 11/1965 | Heller et al. | |

DAVID G. REDINBAUGH, *Primary Examiner.*

JOHN W. CALDWELL, *Examiner.*